United States Patent [19]

Feichtinger

[11] Patent Number: 4,532,713
[45] Date of Patent: Aug. 6, 1985

[54] MULTICOORDINATE SENSING HEAD

[75] Inventor: Kurt Feichtinger, Palling, Fed. Rep. of Germany

[73] Assignee: Dr. Johannes Heidenhain GmbH, Traunruet, Fed. Rep. of Germany

[21] Appl. No.: 518,928

[22] Filed: Aug. 1, 1983

[30] Foreign Application Priority Data

Aug. 12, 1982 [DE] Fed. Rep. of Germany ....... 3229992

[51] Int. Cl.³ .............................................. G01B 11/24
[52] U.S. Cl. .................................. 33/559; 33/169 R; 33/172 E
[58] Field of Search ............. 33/169 R, 172 E, 174 L, 33/143 L

[56] References Cited

U.S. PATENT DOCUMENTS

| 3,250,012 | 5/1966 | Hilton et al. ..................... 33/174 L |
| 4,338,722 | 7/1982 | Delmas ............................. 33/169 R |

FOREIGN PATENT DOCUMENTS

| 0022598 | 1/1981 | European Pat. Off. .......... 33/174 L |
| 1028792 | 5/1959 | Fed. Rep. of Germany .... 33/174 L |
| 1548326 | 7/1970 | Fed. Rep. of Germany .... 33/174 L |
| 2259091 | 6/1974 | Fed. Rep. of Germany .... 33/169 R |
| 2835615 | 8/1978 | Fed. Rep. of Germany .... 33/174 L |
| 2804398 | 12/1979 | Fed. Rep. of Germany .... 33/174 L |
| 1932010 | 6/1980 | Fed. Rep. of Germany .... 33/174 L |
| 56-53401 | 5/1981 | Japan ................................ 33/169 R |
| WO79/00134 | 7/1981 | PCT Int'l Appl. ............... 33/174 L |
| 1599758 | 10/1981 | United Kingdom ............. 33/174 L |

Primary Examiner—Willis Little
Attorney, Agent, or Firm—Willian, Brinks, Olds, Hofer, Gilson & Lione Ltd.

[57] ABSTRACT

A multicoordinate sensing head is disclosed which incorporates a particularly simple mechanical structure to mount the sensing pin in a casing such that the pin is movable in a plurality of directions. Each deflection of the free end of the sensing pin is converted by appropriately shaped components on the sensing pin and the casing into an axial movement of a radially constrained upper end of the sensing pin. The slight axial movements of the upper end of the sensing pin brought about by deflections of the free end of the sensing pin are registered by a photoelectric arrangement arranged in the region of the upper end of the sensing pin. This photoelectric arrangement generates a signal when the free end of the sensing pin is deflected.

8 Claims, 4 Drawing Figures

4,532,713

MULTICOORDINATE SENSING HEAD

BACKGROUND OF THE INVENTION

The present invention is directed to a multicoordinate sensing head of the type which is adapted to be mounted to a measuring or processing machine and which includes a casing and a sensing pin having a sensing end and a mounting end.

Such sensing arrangements are used in conjunction with coordinate measuring machines as well as in numerically controlled processing machines. Typically, such sensing arrangements or heads are used in order to sense or detect the dimensions of the workpiece and/or tool.

A wide variety of such sensing heads are known to the art, and the following discussion will take up only two examples of such sensing heads.

German DE-AS No. 19 32 010 discloses a sensing head in which the sensing pin is mounted in a casing by a ball joint arrangement. The end of the sensing pin disposed opposite the sensing end of the pin bears against an axially slidable sleeve which acts upon a measuring value converter so that each deflection of the sensing pin in either the axial or the radial directions results in an axial displacement of the sleeve, which is measured and registered by the measuring value converter.

British Pat. No. 1,599,758 discloses a sensing head which generates an electrical signal upon contact between a sensing pin and a workpiece. This electrical signal is generated by the closing of an electrical circuit between the electrically conductive workpiece and the sensing head. The sensing pin of this sensing head defines a spherical sensing surface, and the sensing pin is mounted so as to be linearly displaceable with respect to the casing. The end of the sensing pin opposite the sensing end is mounted to be linearly displaceable inside the scanning head casing in a cylindrical sleeve. When the sensing pin is deflected, the end of the sensing pin opposite the spherical sensing surface is shifted axially. The sensing pin defines, in the interior of the sensing head casing, a flange. The circumferential edge of this flange abuts against the bottom of the sensing pin casing thereby causing the sensing pin to tilt on radial deflection of the sensing surface. During such tilting, the sensing pin is radially displaced, which causes a coaxial movement of the radially constrained upper end of the sensing pin. When tilting forces are removed from the sensing pin, a resetting spring operates to return the sensing pin into a zero or rest position. The radially constrained upper end of the sensing pin determines the X and Y coordinates of this rest position and the face surface of the flange secured to the sensing pin serves as a stop in the axial or Z direction. The sensing head disclosed in this British patent relies upon electrical contact being made between the workpiece and the sensing pin, and this sensing head is therefore unusable when an electrically nonconductive workpiece is to be sensed.

SUMMARY OF THE INVENTION

The present invention is directed to an improved sensing head which can be used with either conductive or nonconductive workpieces, and which can be constructed in a particularly mechanically simple and dependable manner, but which to a large extent overcomes disadvantages of known sensing heads.

According to this invention, a sensing head of the type described initially above is provided with means, included in the casing, for allowing the mounting end of the sensing pin to move along a predetermined axial direction while constraining the mounting end of the sensing pin against radial movement perpendicular to the axial direction. A first, rotationally symmetric element is mounted to the sensing pin at a point intermediate of the sensing end and the mounting and, and a second element is included in the casing adjacent the first element. This second element is shaped to bear against the first element in order to center the sensing end of the sensing pin in a predetermined rest position in the absence of radial forces on the sensing end, and to cause the mounting end of the sensing pin to move along the axial direction in response to radial deflection of the sensing end of the sensing pin. In addition, means are provided for sensing the axial position of the mounting end of the sensing pin and for generating a deflection signal in response thereto. Further advantageous features of this invention are set forth in the dependent claims.

The sensing head of this invention provides particularly important advantages in terms of simple construction, reliable and effective generation of the deflection signal, good reproduceability of this deflection signal, and a low susceptibility to interference or noise.

The invention itself, together with further objects and attendant advantages, will best be understood by reference to the following detailed description, taken in conjunction with the accompanying drawings.

DETAILED DESCRIPTION OF THE PRESENTLY PREFERRED EMBODIMENTS

Figure 1:
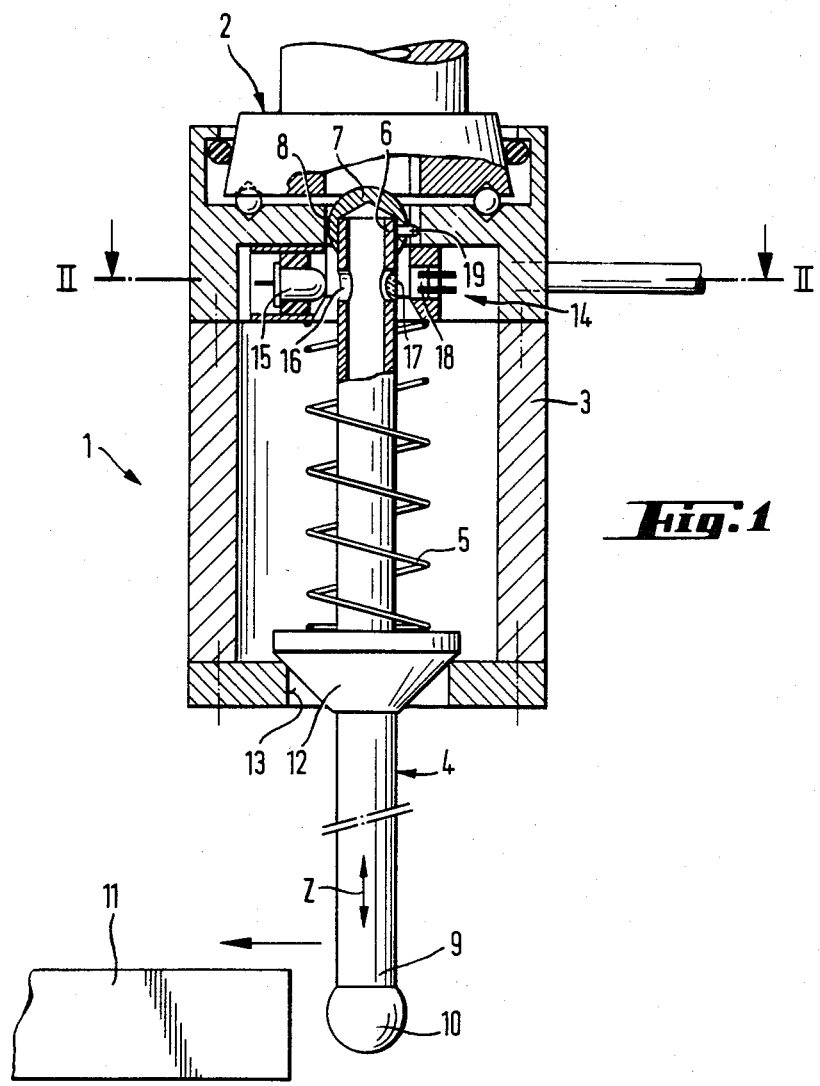
FIG. 1 is a longitudinal sectional view of a sensing head which incorporates a first preferred embodiment of this invention.
Figure 2:
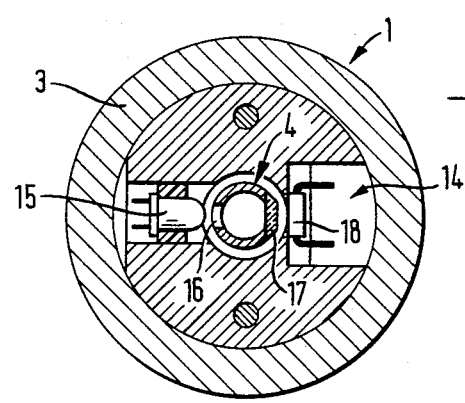
FIG. 2 is a cross-sectional view taken along line II—II of FIG. 1.
Figure 3:
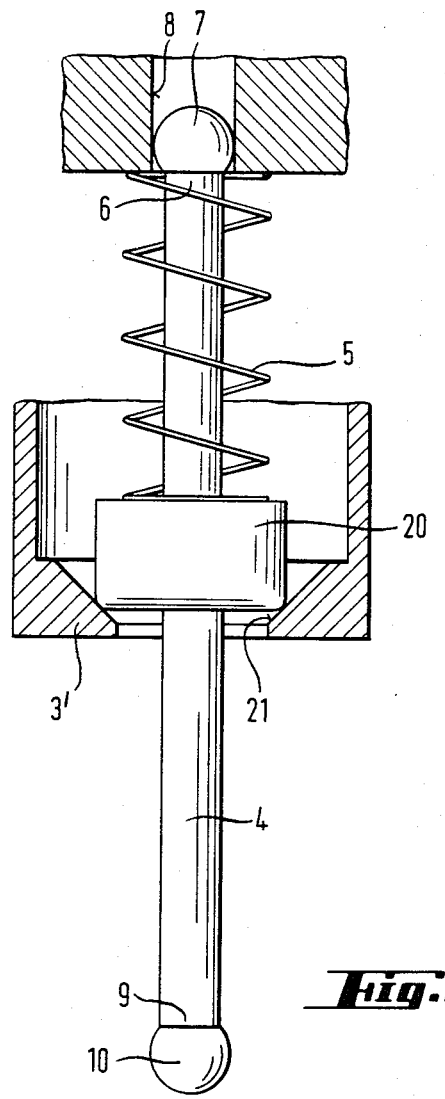
FIG. 3 is a partial longitudinal sectional view of a second preferred embodiment of this invention.
Figure 4:
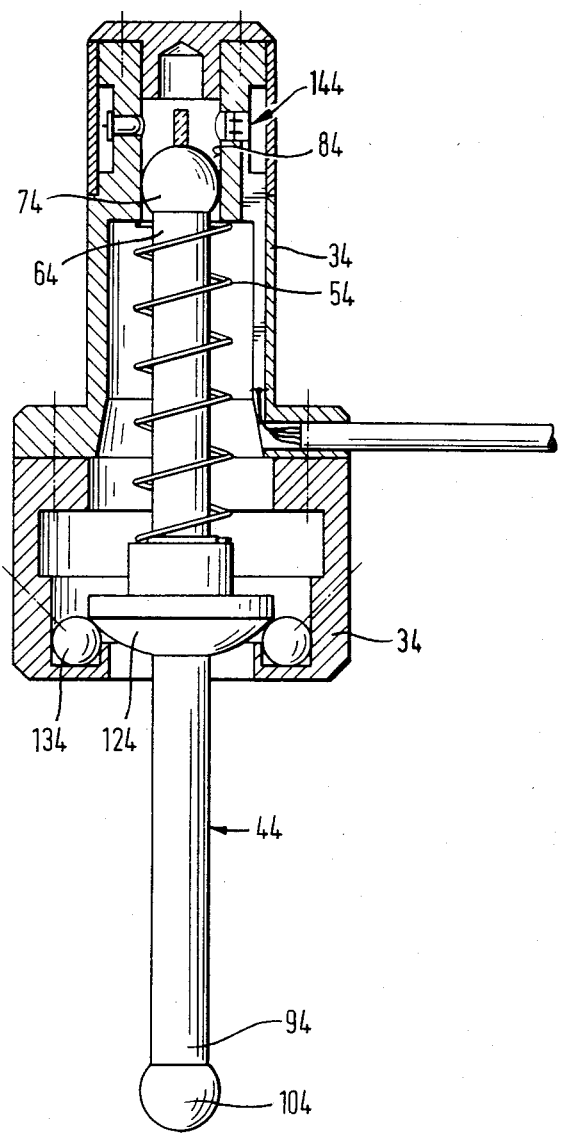
FIG. 4 is a longitudinal sectional view of a third preferred embodiment of this invention.

Turning now to the drawings, FIG. 1 shows a sensing head 1 which includes a multicomponent receiving device 2 which is used to fasten the sensing head 1 to a spindle (not shown) of a measuring or processing machine (likewise not shown). The sensing head 1 includes a sensing head casing 3 and a sensing pin 4 which is movably mounted in the sensing head casing 3. The sensing pin 4 is biased into a predetermined zero or rest position by a resetting force generated by a spring 5. A mounting end 6 of the sensing pin 4 is situated in the interior of the sensing head casing 3 and is constrained against radial movement by a ball joint 7. However, the mounting end 6 of the sensing pin 4 is slideably mounted so as to move along an axial direction in a cylindrical guide 8 defined by the sensing head casing 3. In this preferred embodiment, the cylindrical guide 8 is defined by a cylindrical bore formed in an upper portion of the casing 3 and the ball joint 7 is formed by a spherical surface defined by the mounting end 6 of the sensing pin 4. It should be understood that as used herein the term "spherical surface" is intended in its broad sense to include surfaces which are partially spherical, as shown in FIGS. 1, 3 and 4.

The sensing pin 4 defines a sensing end 9 which is a free end, disposed distally of the casing 3. A sensing ball 10 is arranged on the free end 9 of the sensing pin 4, and is used to scan a workpiece 11 in a known manner in the direction indicated by the arrow in FIG. 1. At the moment of contact between the scanning ball 10 and the workpiece 11, the scanning pin 4 is slightly deflected in a radial direction. An element in the shape of a truncated cone 12 is mounted to the sensing pin 4 intermediate of the sensor ball 10 and the mounting end 6 of the sensing pin 4. The casing 3 defines a lower plate which defines a cylindrical bore 13 positioned such that the sensing pin 4 extends through the bore 13, and an edge of the bore 13 bears against the conical surface of the element 12. Radial deflection of the sensing pin 4 brings about a shifting of the scanning pin 4 along the generatrix line of the bore 13 of the casing 3, thereby bringing about an axial displacement of the mounting end 6 of the pin 4. Because the mounting end 6 of the pin 4 is radially constrained in the cylindrical guide 8, only axial movements of the mounting end 6 are possible.

A photoelectric measuring arrangement 14 is provided directly under the constrained mounting end 6 of the pin 4 in order to measure the axial movement of the mounting end 6. This measuring arrangement includes a light source 15, such as a light-emitting diode, which directs light toward the sensing pin 4. The portion of the sensing pin 4 adjacent the light source 15 defines an opening 16 having a cylindrical lens 17 mounted within it. Light passing from the light source 15 through the opening 16 and the lens 17 falls upon a differential photoelement 18 on the other side of the sensing pin 4. In the rest position, the lens 17 operates to illuminate the differential photoelement 18 in a symmetrical manner. However, once the sensing pin 4 is shifted axially even to a slight extent, the symmetry of illumination is destroyed, and the differential photoelement 18 operates to generate an output signal which is interpreted by an electronic evaluating circuit (not shown) as a trigger signal, indicative of contact between the workpiece 11 and the sensing pin 4. This trigger signal can be used in a known manner for the control of a measuring instrument, for example as by stopping movement of a motor or by transferring an instantaneously prevailing measuring value into a memory arrangement.

Because of the rotational symmetry of the embodiment of FIG. 1, it does not matter whether the sensing pin 4 is deflected in an axial direction by contact with the workpiece 11 or in a plane running at a right angle to this axial direction. This is because any deflecting movement of the pin 4 is converted into an axial shifting movement of the radially constrained mounting end 6 of the sensing pin 4.

When the sensing pin 4 is removed from contact with the workpiece 11, the resetting force supplied by the spring 5 operates to return the pin 4 to its rest or zero position. The precisely defined zero position is assured in all three coordinate directions by the cone 12 in cooperation with the bore 13. The cone 12 both centers the sensing pin 4 and also establishes a stop in the Z or axial direction in order to define precisely an exact position of the scanning ball 10 with respect to the sensing head casing 3.

As shown in FIG. 1, a twisting safeguard arrangement 19 is provided to prevent rotation of the sensing pin 4 with respect to the sensing pin casing 3.

It should be understood that alternate embodiments of this invention may be provided which include elements on the intermediate portion of the sensing pin 4 which are rotationally symmetrical in shapes other than the truncated cone shown in FIG. 1. For example, as shown in FIG. 3, an element 20 can be mounted to the intermediate portion of the pin 4 which is shaped as a cylinder. In this case, it is preferred that the bearing surface on the casing 3 which cooperates with the cylinder 20 preferably be shaped as a conical bore 21 defined in the bottom of the casing 3'. In FIG. 3, reference numeral 21 is used to indicate the generatrix line of the conical bore.

FIG. 4 shows a third preferred embodiment of this invention in which essentially similar elements are designated by the same reference numerals as those of FIG. 1 with the supplementary identifying digit "4". As before, the sensing pin 44 is provided with an element for converting radial deflection of the sensing pin 44 into axial movement of the upper end of the sensing pin 44 and for spatially centering the free end 94 of the sensing pin 44. In this case, this element is represented by an element which defines a spherical surface 124. This spherical surface 124 is supported by a plurality of spherical balls 134 which are uniformly distributed annularly around the inner circumference of the cylindrical bore formed in the lower part of the casing 34.

In addition, the present invention can readily be adapted to sensing heads which utilize other measuring arrangements than the measuring arrangement 14 for the generation of a deflection signal. For example, a photoelectric length measuring instrument or alternately, inductive, capacitive, or magnetic impulse generating arrangements may be adapted for use. It is also possible to provide a more sensitive length measuring device to measure the axial position of the upper end of the sensing pin, as for example a photoelectric incremental length measuring device which generates a signal proportional to the deflection of the sensing pin.

In view of the many changes and modifications to the preferred embodiments described above which will be apparent to those skilled in the art, it is intended that the foregoing detailed description be regarded as illustrative rather than limiting, and it is the following claims, including all equivalents, which are intended to define the scope of this invention.

I claim:

1. In a sensing head adapted to be mounted to a measuring or processing machine, said sensing head comprising a casing and a sensing pin having a sensing end and a mounting end, the improvement comprising:

means, included in the casing, for allowing the mounting end to move along a predetermined axial direction while constraining the mounting end of the sensing pin against radial movement perpendicular to said axial direction;

a first, rotationally symmetric element mounted to the sensing pin at a point intermediate of the sensing end and the mounting end;

a second element included in the casing adjacent the first element, said second element shaped to bear against the first element in order to center the sensing end of the sensing pin in a predetermined rest position in the absence of radial forces on the sensing end and to cause the mounting end of the sensing pin to move along the axial direction in response to radial deflection of the sensing end of the sensing pin; and means, mounted adjacent the mounting end of the sensing pin, for sensing the axial position of the mounting end of the sensing pin and for generating a deflection signal in response thereto;

said first element mounted to the sensing pin comprising a truncated cone and said second element included in the casing comprising a torus defining a central opening sized to receive the sensing pin, said torus shaped to surround and contact the truncated cone to center the sensing pin.

2. The invention of claim 1 wherein the second element comprises a plate which defines a cylindrical bore through which the sensing pin passes such that an edge of the cylindrical bore contacts the truncated cone.

3. The invention of claim 1 wherein the mounting end of the sensing pin defines a spherical surface and the constraining means comprises a plate which defines a cylindrical bore sized to receive and confine the spherical surface against radial movement.

4. The invention of claim 1 wherein the sensing means comprises:
a light source;
a photosensitive element; and
an optically active element positioned to direct light from the light source to the photosensitive element.

5. The invention of claim 4 wherein the light source comprises a light emitting diode, the photosensitive element comprises a differential photosensor, and the optically active element comprises a cylindrical lens.

6. The invention of claim 1 wherein the sensing means comprises a photoelectric length measuring device.

7. The invention of claim 1 wherein the sensing pin is formed as a rigid unit.

8. The invention of claim 7 wherein the sensing means comprises a component mounted directly on the sensing pin.

* * * * *